Sept. 19, 1967 R. K. WILMER 3,342,371
DOCUMENT RETRIEVAL SYSTEM
Filed May 20, 1963 7 Sheets-Sheet 2
FIG. 2
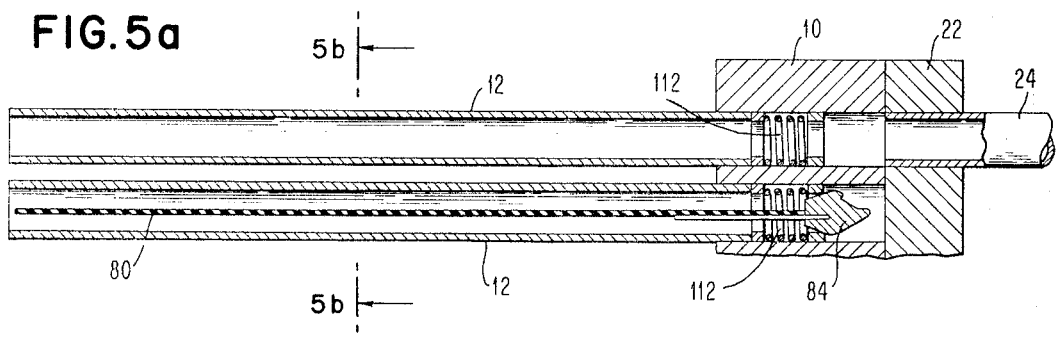
FIG. 5a
FIG. 5b
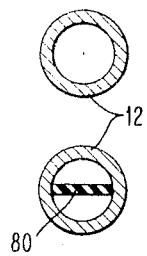
FIG. 6
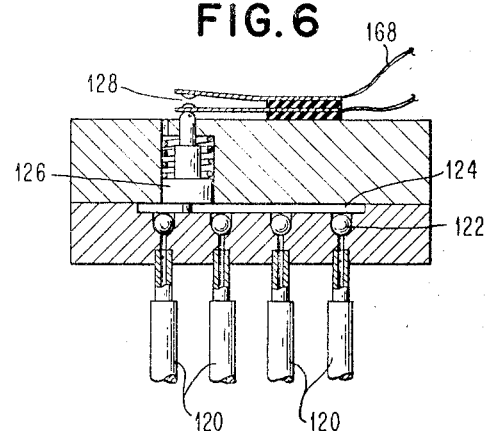

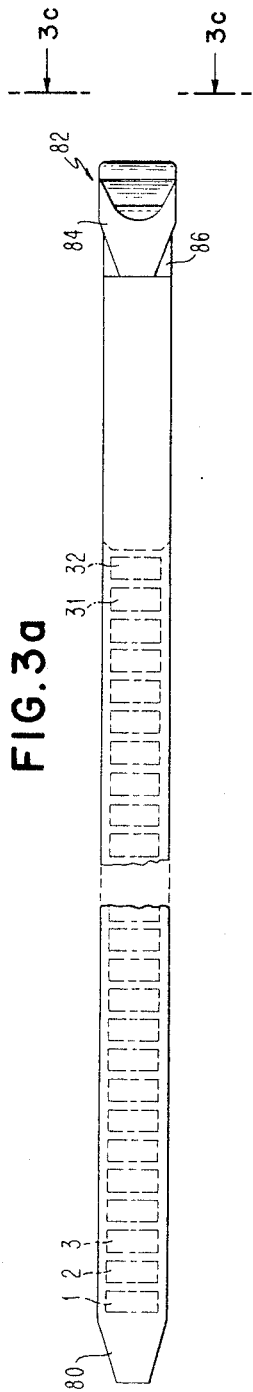
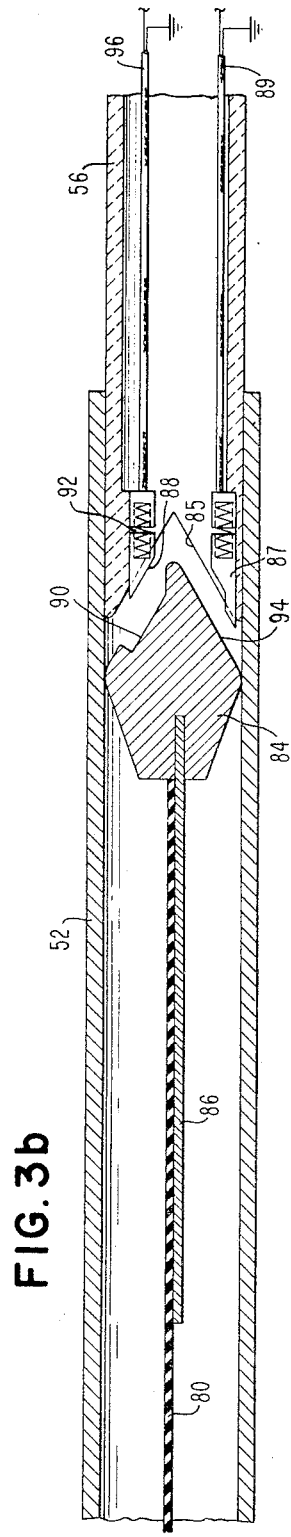
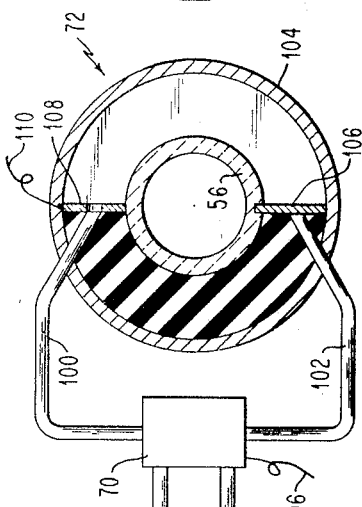
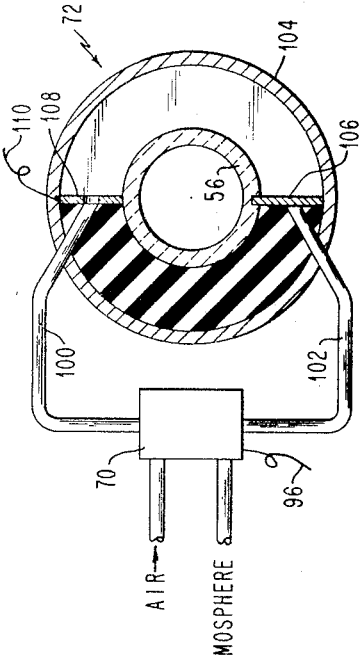

Sept. 19, 1967  R. K. WILMER  3,342,371
DOCUMENT RETRIEVAL SYSTEM
Filed May 20, 1963  7 Sheets-Sheet 6
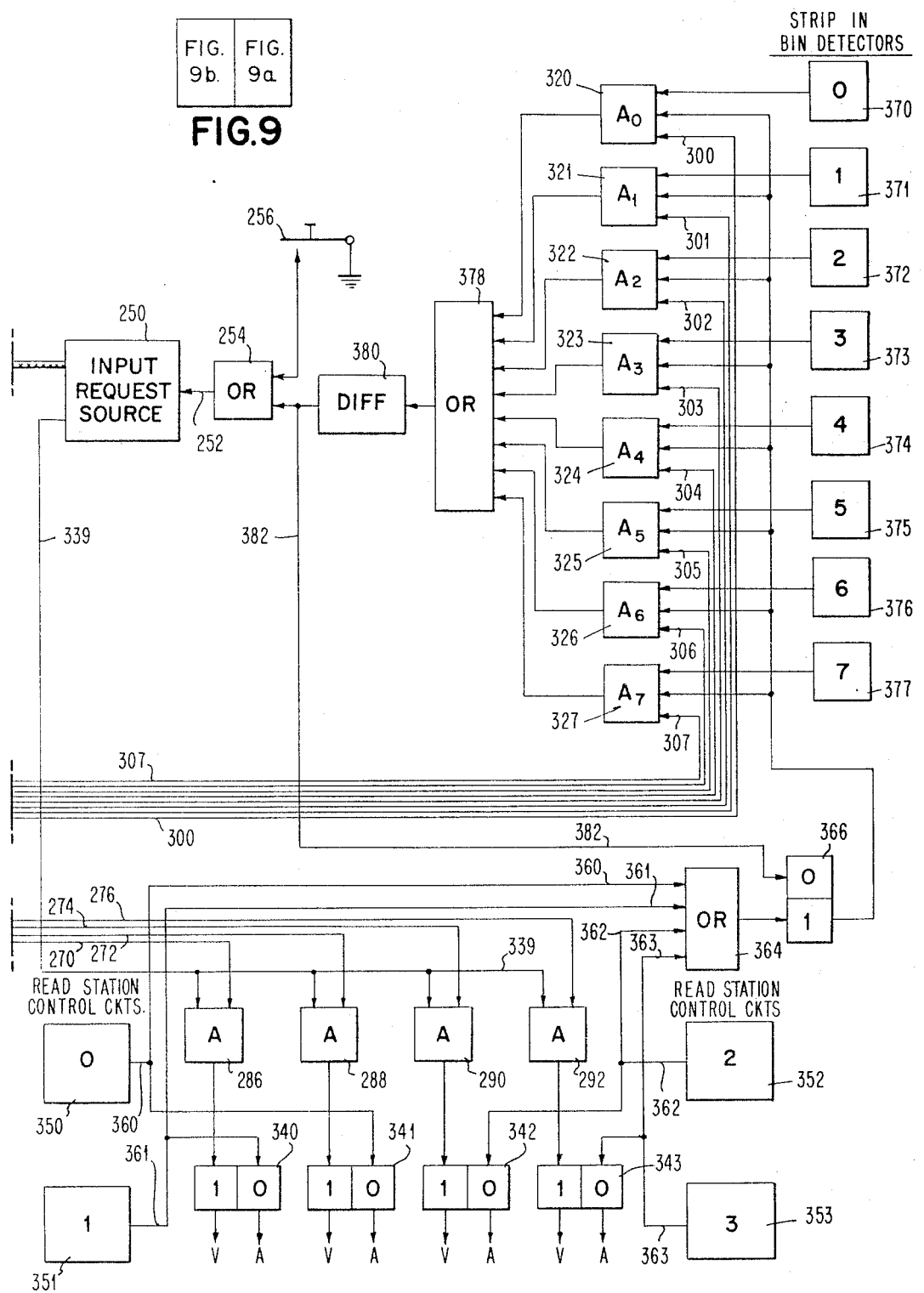

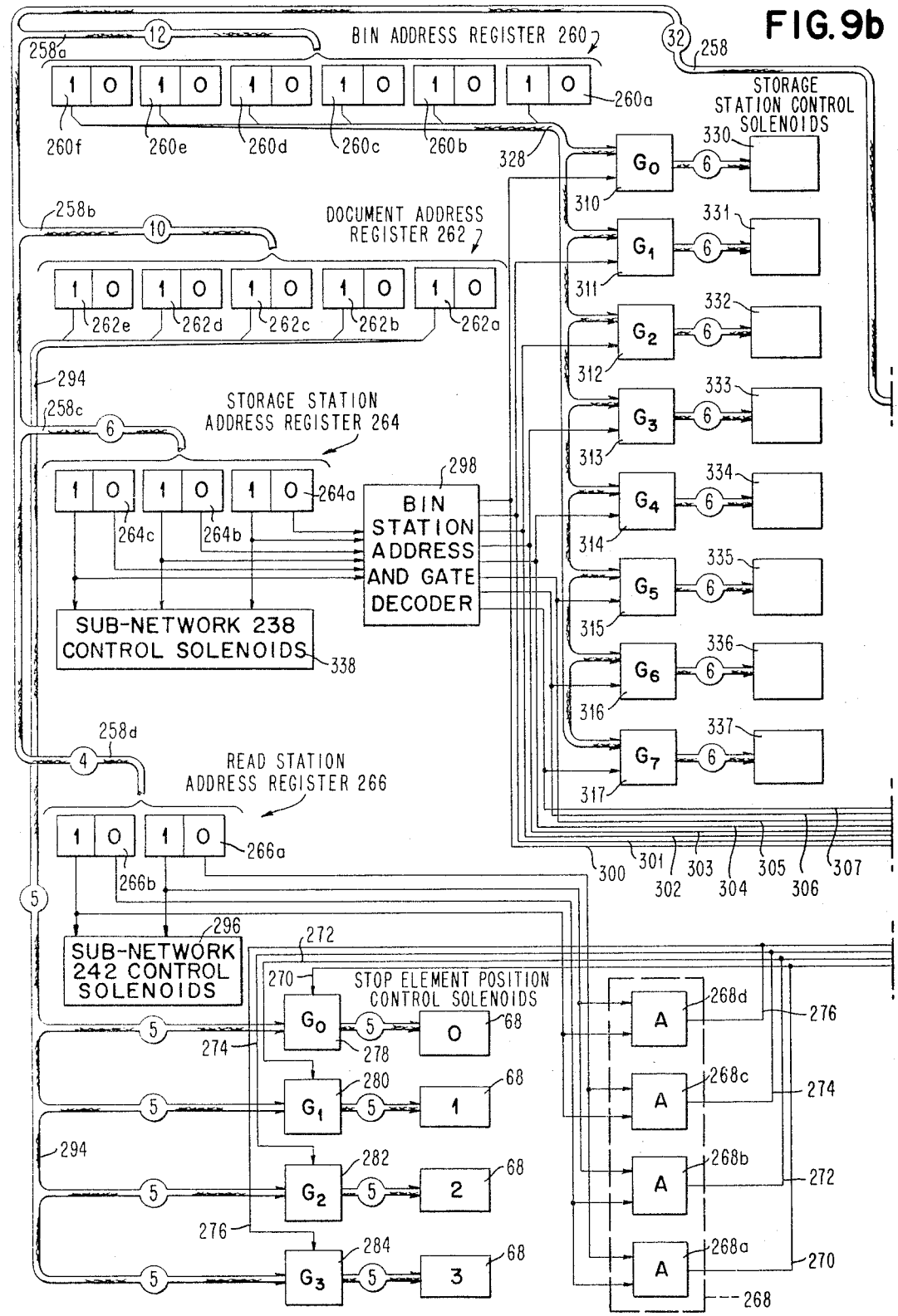

United States Patent Office 3,342,371
Patented Sept. 19, 1967

3,342,371
DOCUMENT RETRIEVAL SYSTEM
Richard K. Wilmer, Yorktown Heights, N.Y., assignor to International Business Machines Corporation, New York, N.Y., a corporation of New York
Filed May 20, 1963, Ser. No. 281,594
18 Claims. (Cl. 221—13)

ABSTRACT OF THE DISCLOSURE

There is disclosed a rapid access document retrieval system utilizing a series of sets of flexible transport tubes, the ends of which are quickly shifted short distances to provide a continuous closed path for withdrawing a film strip from a storage bin, for transporting the selected film strip to a sensing station, optionally recording therefrom, and for returning the film strip to its storage bin.

Each strip has fixed to its forward end a wedge shaped tip or head, the cross section of which is substantially the same shape and size as the inner opening of the storage bin and the flexible transport tubes to form a slidable but air-tight fitting.

The storage bins are arranged in a matrix form, and shiftable means are provided to move the storage matrix one position to X and Y positions at right angles and also to a third composite position between the X and Y directions. One transport tube is provided for each set of four storage bins. This transport tube leads to a matrix-like arrangement of storage tubes which may likewise be moved one position in any of three directions. One transport tube is provided for each set of four transport tubes leading into this matrix. Successive matrices are provided which, when properly positioned, provide a single air-tight light-proof transport path from any desired storage bin to the sensing station. Vacuum is applied at the sensing station, which vacuum draws the closely fitted tip attached to the desired strip and therefore, the desired strip, through the arranged flexible and opaque transport path to the optical sensing station. A strip is returned rapidly to its storage bin by applying a blast of air to the transport path at the sensing station.

---

This invention relates to document retrieval systems, and more particularly to an improved system for retrieving a document image recorded on a record strip.

A serious problem in both government and business is that of storing large volumes of documents and of being able to retrieve a desired document rapidly and at low cost. One method of achieving large volume storage is to reproduce a micro-image of the document to be stored on a thin record strip such as, for example, a photographic film strip. The storage and retrieval of record strips of this type is complicated by their small size, the large number of such strips which must be stored, this number running up into the thousands or even millions in some systems, and by the fact that, particularly where a photographic film strip is used, physical contact with the document-storing portion of the record strip must be avoided.

One present system for working with these record strips is to store them in bins and to select a desired strip mechanically by moving an arm to the bin where the desired record is stored, picking the record out with a finger-like mechanism, mechanically moving the arm with the attached record to a utilization station, and reversing the above operations to return a record to its storage bin. Systems of this type have proven to be relatively cumbersome, and expensive. More recently, schemes have been proposed to substitute pneumatic ejector and transport mechanisms for the mechanical picker arms previously used. These systems, however, require that a relatively large bin having considerable weight and inertia, be moved over a relatively large distance to position a desired record strip in line with the ejection and transport mechanism. Shorter movements of the storage bins are desirable both for increased speed and for economy of operation.

Another desirable feature of any document retrieval system is that it be capable of delivering the document to a remote location where the information contained therein is required, but where sufficient space for storing the document file is not available. Remove accessing is also required where information is stored at one location but may be required at several remote locations or, in the more general case, where information is stored at a number of remote locations and may be required at a number of other remote locations. Neither of the systems described above is capable of delivering a document from the bin where it is stored to a remote utilization station.

Still another desirable feature of any document retrieval system is that it have a modular construction so that additional storage capacity may be added to it as this capacity is required, without causing the entire system to be redesigned. In some instances, it may be desired to store all documents relating to a particular subject on a single film strip. To do this, part of the film strip should be left unexposed so that documents relating to the particular subject may be added to it as they come in. A document retrieval system for handling such film strips must be light-tight so as to avoid exposing the unexposed portions of the film strips. The system should also be air tight to keep dust and dirt away from the film strips. Other desirable features of any document retrieval system are low cost and low access time to any desired document.

The primary object of this invention is therefore to provide an improved document retrieval system.

A more specific object of this invention is to provide a system for retrieving documents stored on record strips which system does not require the movement of large masses over relatively great distances.

Another object of this invention is to provide a document retrieval system, the storage capacity of which may be readily increased as required.

A further object of this invention is to provide a document retrieval system which is capable of delivering a document-containing record strip to any one of a plurality of document utilization stations, positioned remotely from the document storage location.

A still further object of this invention is to provide a document retrieval system which is capable of retrieving documents from any one of a plurality of remote document storage stations and of delivering the retrieved documents to any one of a plurality of remote document utilization stations.

Another object of this invention is to provide a document retrieval system which provides the user with the option of either having a retrieved document automatically reproduced and returned to its storage position, or of viewing the document and reproducing only those documents which are of interest to him, returning the other documents under manual control, to their storage position without being reproduced.

Another object of this invention is to provide a light-tight document retrieval system which permits the use of partially exposed film strips so that additional documents of a given class may be recorded on the same film strip as they are generated.

A further object of this invention is to provide a document retrieval system which protects the film strips from dust and dirt by never exposing them to atmosphere.

A further object of this invention is to provide a document retrieval system of the type described above which is relatively inexpensive to build and use.

A still further object of this invention is to provide a document retrieval system of the type described above which affords relatively low access time to a requested document.

In accordance with these objects, this invention provides a bin-like structure having a plurality of record strip storing positions, these positions being arranged in a matrix array. Tubes are provided for forming a single path selectively from any desired storing position to a document utilization station. There may be several storage bins and/or several document utilization stations, these elements being positioned either adjacent to or remote from each other. The transport path forming tubes are formed into N arrays, these arrays being positioned one in front of the other, and each array having a lesser number of tubes than the array preceding it. Means are provided to cause relative motion between each array the arrays adjacent to it and to cause relative motion between the rear-most array and the storage bin, so that each tube of an array is capable of being positioned in front of a plurality of tubes in the array preceding it. By proper relative movement of the arrays, a single path may be formed from any selected storing position through one tube of each array, to the selected utilization station. After a path is formed, the desired record strip is driven therethrough to a utilization station.

The foregoing and other objects, features and advantages of the invention will be apparent from the following more particular description of preferred embodiments of the invention, as illustrated in the accompanying drawings.

In the drawings:

FIG. 2 is a chart showing the addresses of the storage positions in the bin of FIG. 1 and positioning information relative thereto.

FIG. 3a is a top view of a film strip suitable for use in the system shown in FIG. 1.

FIG. 3b is a sectional side view of the film strip shown in FIG. 3a and of the stop member used in conjunction therewith.

FIG. 3c is a front view of the film strip shown in FIG. 3a.

FIG. 4 is a front sectional view of a film-strip rotating mechanism suitable for use in the system shown in FIG. 1.

FIG. 5a is a side sectional view of two storage positions in the bin shown in FIG. 1.

FIG. 5b is a front sectional view of the bin storage positions taken along the line 5b—5b in FIG. 5a.

FIG. 6 is a sectional view of a strip-in-bin detector mechanism suitable for use with the system shown in FIG. 1.

FIG. 9 is a diagram showing how FIGS. 9a and 9b are combined to form a block diagram of an electronic control circuit for the system shown in FIG. 8.

Figure 8:
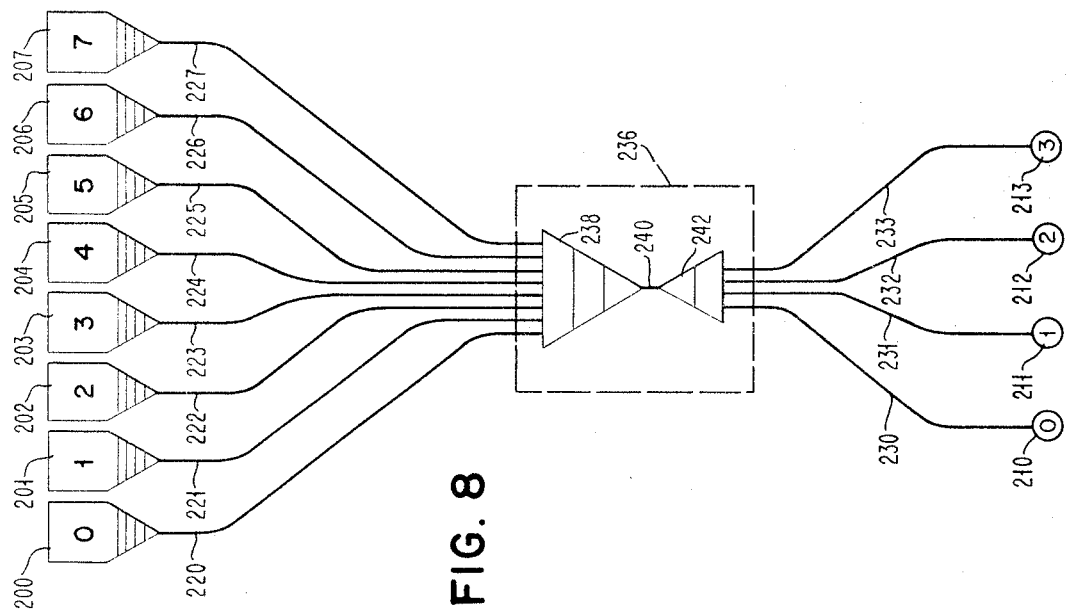
FIG. 8 is a diagram of one embodiment of the document storage and retrieval system of this invention having a plurality of document storage stations and a plurality of document utilization stations.

FIGS. 9a and 9b when taken together form a block diagram of an electronic control circuit for the system shown in FIG. 8.

Figure 10:
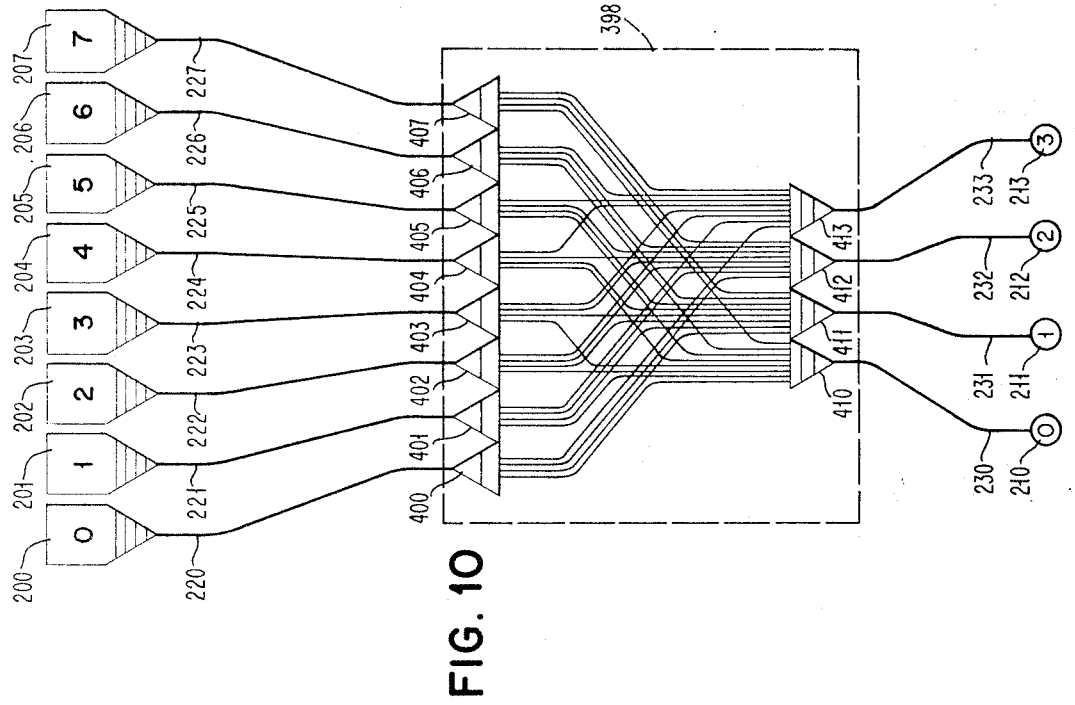

FIG. 10 is a diagram of another embodiment of the document storage and retrieval system of this invention having a plurality of storage stations and a plurality of utilization stations.

GENERAL DESCRIPTION

Figure 1:
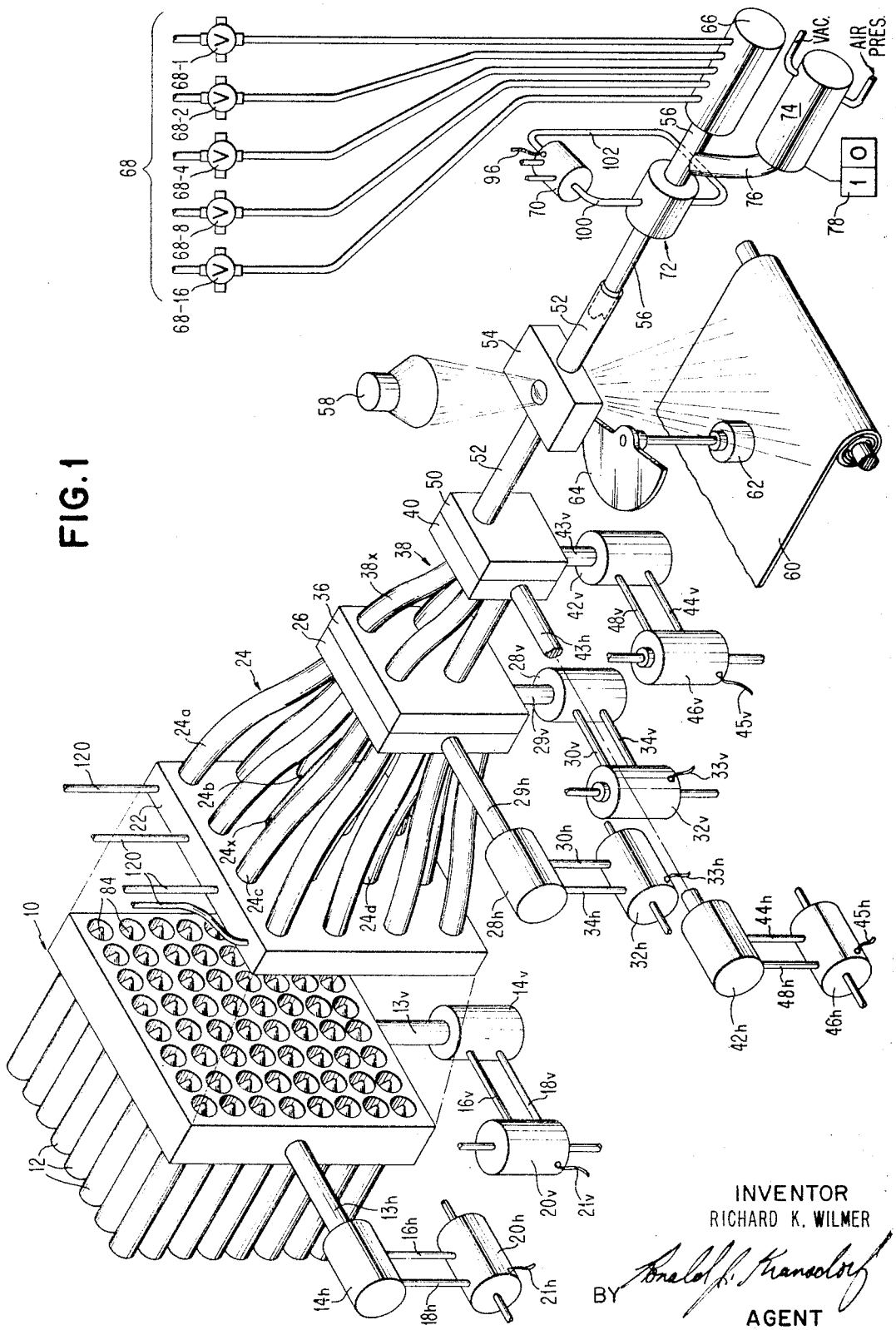
FIG. 1 is a perspective view of a preferred embodiment of the document storage and retrieval system of this invention, having a single storage station and a single utilization station.

Referring to FIG. 1, there is shown a bin 10 having a plurality of circular record receiving positions 12. Each position 12 has a 6-bit binary address, the first three (left hand) bits defining vertical column addresses and the second three (right hand) bits defining horizontal row addresses. These addresses are shown in FIG. 2 which is a schematic representation of bin 10.

Attached to the bottom of bin 10 is the output ram 13v (vertical) of a pneumatic cylinder 14v and attached to the left side of the bin is the output arm 13h (horizontal) of a pneumatic cylinder 14h. These arms are normally in a retracted position with air pressure on lines 16v and 16h and atmospheric pressure on lines 18v and 18h, respectively. However, when a signal is applied to a 4-way electrically operated valve 20v, via a lead 21v, air pressure is applied to line 18v and atmosphere to line 16v causing the cylinder arm 13v to be moved to its extended position. This moves bin 10 vertically a distance equal to the center-to-center spacing of the rows of positions 12. Likewise, when a signal is applied to a 4-way valve 20h via a lead 21h, air pressure is applied to line 18h, and atmosphere to line 16h, causing cylinder arm 13h to be moved to its extended position. This causes bin 10 to be moved to the right a distance equal to the center-to-center spacing of the columns of positions 12. Positioned flush against the face of bin 10 is a stationary matrix plate 22. While plate 22 is positioned flush against bin 10, it is not connected thereto and these two elements are free to move relative to each other. Plate 22 has 16 openings drilled therethrough which are normally in front of the sixteen film strip receiving positions 12, which are shaded in FIG. 2. By moving bin 10 one position in the vertical direction, the sixteen bin addresses marked with the letter V in FIG. 2 are positioned in front of the openings in plate 22. By moving bin 10 one position in the horizontal direction, the sixteen bin addresses marked with the letter H in FIG. 2 are positioned in front of the openings in plate 22. Finally, by moving the bin 10 both horizontally and vertically, the bin positions marked with the letter B in FIG. 2 are positioned in front of the openings in plate 22.

Each opening in plate 22 has a tube 24 leading out therefrom. The sixteen tubes 24 are connected to sixteen openings in matrix plate 26. The position of plate 26 is controlled by pneumatic cylinders 28v and 28h, which are operable to move plate 26 one position vertically and/or one position horizontally. Arms 29v and 29h of these cylinders are normally in a retracted position with air pressure on lines 30v and 30h and are raised to an extended position by a signal applied to 4-way valves 32v or 32h, respectively, via lines 33v or 33h, to cause air pressure to be applied to lines 34v and 34h, respectively.

A stationary matrix plate having four openings is positioned flush against the front surface of plate 26. The four openings in plate 36 are positioned in front of the openings in plate 26 which are connected to transport tubes 24a, 24b, 24c, and 24d. By energizing pneumatic cylinders 28v and 28h either singularly or in combination, the other 12 openings in plate 26 may be positioned in front of one of the four openings in plate 36 in a manner similar to that previously described for positions 12 of the bin 10 and the openings in plate 22.

The four openings in plate 36 are connected by air tubes 38 to four holes in a plate 40. The position of matrix plate 40 is controlled by pneumatic cylinders 42v and 42h. Arms 43v and 43h of these cylinders are normally in a retracted position with air pressure applied to lines 44v and 44h and are driven to an extended position when a signal is applied via lines 45v and 45h to 4-way valves 46v and 46h, respectively, causing air pressure to be applied to lines 48v and 48h, respectively. A stationary matrix plate 50 is positioned flush against the front of matrix plate 40. Matrix plate 50 has a single opening which is normally positioned in front of the opening in plate 40 which is connected to tube 38x. The other three openings in plate 40 are positioned in front of the opening in matrix plate 50 by extending cylinder arms 43v and 43h, either singly or in combination.

A tube 52 leads from the opening in matrix plate 50 through an optical-read station 54 having a lens (not shown) therein and is terminated by a stopping member 56. The details of this stopping member are described later. Light is applied to optical-read station 54 by a light source 58. The light from source 58 causes an image of the desired document to be reproduced on output film 60. In order to provide a sufficient gap at the read station for a film strip to pass through while also providing a small gap for proper focusing, optical read station 54 has a movable head structure such as that shown in co-pending application Serial No. 159,250, filed December 14, 1961, on behalf of H. A. Khoury and R. K. Wilmer, entitled "Document Sensing Station" and assigned to the assignee of the instant application. The film strip is supported in the proper position for reading at the read station by an air bearing.

In some instances, the user does not wish to reproduce every document applied to optical-read station 54 on output film 60, but would prefer to scan the documents as they are fed to the read station and cause only select documents to be reproduced. In this situation, rotational actuator 62 is energized in a manner to be described later, to cause a mirror 64 to be placed between optical-read station 54 and output film 60. Actuator 62 consists of a moving coil suspended between the poles of a U-shaped permanent magnet. The desired rotation of the coil occurs when a current of known magnitude is applied to it. This is the well-known D'Arsonval movement. The image of the requested document is reflected by mirror 64 to a viewing screen (not shown) where the user may scan it and determine whether he wishes to have it reproduced or not. If the user determines that he wishes to reproduce the document on film strip 60, actuator 62 is deenergizing allowing mirror 64 to return to the position shown in FIG. 1 and allowing the image to be projected onto output film 60.

Referring to FIG. 3a, it is shown that each film strip 80 stored in bin 10 has a column of 32 documents stored thereon. In order to read the proper one of these 32 documents, it is necessary that the film strip be stopped with the desired document under the lens in optical-read station 54. This is accomplished by attaching stop member 56, FIG. 1, to the output arm of piston adder 66. The arm of piston adder 66 (shown in FIG. 1 as an extension of member 56) is normally in a retracted position and is moved to any one of 31 possible extended positions by energizing one or more of the five solenoid valves 68. The individual valves are numbered 68–1, 68–2, 68–4, 68–8 and 68–16 to indicate that the input to the valves is binary. Since stop member 56 is connected to the output arm of piston adder 66, each change in the position of piston arm causes a corresponding movement of stop member 56 in tube 52 to vary the position at which a film strip 80 will be stopped in optical-read station 54.

As a film strip passes through the tubes 24, 38 and 52, there is a possibility of its rotating so that it will not be properly oriented when it reaches optical-read station 54. As described later, the design of the stop member 56 and the film strip assembly is such that these elements co-act to position the film strip either in a properly oriented position or in a position rotated 180° from the desired position. If it is detected that a 180° rotation has occurred, a signal is applied in a manner to be described later to a 4-way valve 70 to cause stop member 56 to be rotated 180° by member 72. Member 72 is shown in detail in FIG. 4 and described later.

Air pressure is normally applied to the system through 3-way valve 74, line 76, stop member 56, and tube 52. However, when it is desired to draw a requested document-containing film strip from bin 10 to optical-read station 54, flip-flop 78 is switched to its ONE state in a manner to be described later to cause the contact in 3-way valve 74 to be transferred, allowing vacuum to be applied to the system through this valve and through line 76.

*Film strip assembly*

Referring again to FIGS. 3a–3c, a film strip assembly suitable for use in the system of FIG. 1 is shown. The assembly is made up of two parts, the film strip 80, and the head assembly 82. The head assembly consists of a wedge shaped tip 84 having a short strip 86 firmly attached thereto. The film strip 80 is bonded to the strip 86. No information is recorded on the portion of the film strip bonded to strip 86. The remainder of the film strip has a column of 32 document storage addresses at which documents may be stored. As will be shown later, it is not necessary that documents be initially stored at all 32 possible document storage addresses.

Film strip 80 and strip 86 both have flat cross sections. However, as shown in FIG. 3c, tip 84 has a circular cross section. The diameter of this circular cross section is substantially the internal diameter of record receiving positions 12 and of transport tubes 24, 38, and 52. The tip 84 can therefore pass through these elements but does not allow air to flow past it.

FIG. 3b shows a film assembly about to be stopped by stop member 56. In this figure, the film strip is shown as being properly oriented to be read by optical-read station 54 (FIG. 1). If the film strip has rotated in the tubes less than 90° from the position shown in FIG. 3b, the wedge shaped tip 84 of head 82 co-acts with the V-shaped groove 85 in stop member 56 to rotate the film strip back to the desired position. If the film strip had rotated more than 90° in either direction, these two elements co-act to rotate the film strip to a position 180° reversed from that shown in FIG. 3b. Wedge-shaped tip 84 and stop member 56 therefore co-act to cause the film assembly to be either properly oriented or 180° reversed from proper orientation.

If the film strip is properly oriented, projection 88 in stop member 56 fits into a notch 90 in tip 82, but does not make contact therewith. Electrical contacts 92 therefore remain open. If the film strip is reversed 180°, surface 94 of tip 84 abuts against projection 88 forcing this projection backward to close contacts 92. The closing of contacts 92 causes a signal to be applied through line 96 to 4-way valve 70 (see FIGS. 1 and 4). Regardless of the orientation of the film strip, when tip 84 fits into stop member 56, it closes contacts 87, causing an output signal on line 89. Contact 87 therefore serves as a film-at-read-station detector.

*Rotating mechanism*

Referring now to FIG. 4, 4-way valve 70 normally applies air pressure to line 100 and atmospheric pressure to line 102. Rotation member 72 consists of stop member 56, which is a hollow tube rotatably positioned in sleeve 104. Half of the gap between stop member 56 and sleeve 104 is solid and the other half is open. An electrically conductive vane 106 is attached to the outer surface of member 56 and projects into the open portion between member 56 and sleeve 104. With air pressure applied to line 100, the vane is held in the position shown in FIG. 4. When a signal is applied through line 96 to 4-way valve 70 indicating that stop member 56 is to be rotated, air pressure is transferred from line 100 to line 102 and atmospheric pressure is applied to line 100. The air pressure applied to line 102 acts on the vane 106 causing member 56 to be rotated 180° in which position the contacts 106 and 108 complete a circuit from ground through a line 110. The signal on line 110 indicates that the rotation of stop member 56 has been completed and that the film strip 80 is now properly oriented to be read.

Record receiving positions

FIGS. 5a and 5b show two record receiving positions 12 of bin 10. As shown in FIGS. 5a and 5b, each film strip receiving position is a tube shaped opening in bin 10 having a shock absorber spring 112 fixed at its entrance. The rear of tip 84 fits into the shock absorber springs, as shown for the lower receiving position in FIG. 5a, to stop a film strip when it is returned to the storage bin without causing damage to the rear surface of the film strip. As shown in FIG. 5b, only the edges of the film strip can touch the side of the circular record receiving positions, thereby preventing the document-containing portions of the film strip from physically contacting any surface. Since transport tubes 24, 38 and 52 (FIG. 1) have the same cross section as is shown in FIG. 5b, the system allows a film strip to be stored and retrieved without any physical contact with recorded-on portions.

Strip-in-bin detector

FIG. 6 shows a suitable device for detecting that a strip is in bin 10. An air supply tube 120 is connected to each opening in plate 22 (FIG. 1). Only the air supply tubes 120 for the top row of tubes 24 are shown in FIG. 1. A ball valve 122 rests at the top of each of the input lines 120. The lines 120 feed into a chamber 124. A plunger 126 rests with its lower surface in chamber 124. When air is flowing through one of the tubes 120, its associated ball valve 122 is raised, causing a pressure increase in chamber 124. This pressure is applied to the lower surface of plunger 126 to raise the plunger thereby closing contacts 128. Since at any given time there is only one complete path from line 76 to one of the openings in plate 22, air cannot be applied to any of the tubes 120 unless this path is open. Since head 84 fits snugly in air tubes 24, 38 and 52 and prevents air from flowing past it, air pressure will be applied to a tube 120 only if the selected film strip is in its receiving position 12 in bin 10. There need be only one contact 128 for each bin 10 in the system.

Control circuit

Figure 7:
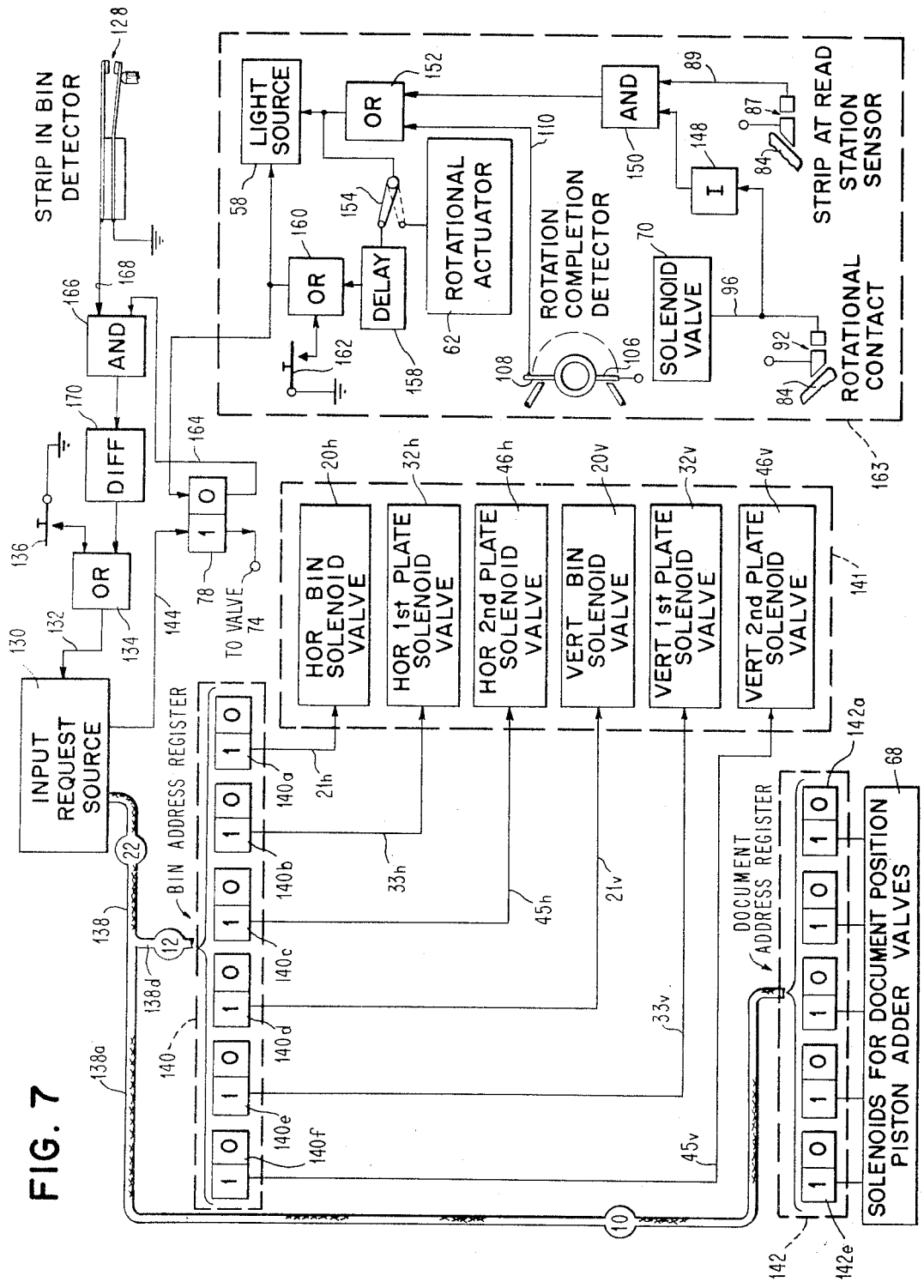
FIG. 7 is a block diagram of an electronic control circuit for the system shown in FIG. 1.

FIG. 7 is a block diagram of an electronic control circuit for the system of FIG. 1. Address information for a requested document is applied to the system by input request source 130. The nature of this device will depend on the source of the address information. For example, source 130 could be a card reader, an incremental magnetic tape or paper tape reader, or even a manual keyboard. The only limitation on this source is that it be capable of supplying a unit of information to the system in response to a request and of then waiting until another request is made before supplying another unit of information to the system. For the preferred embodiment the source is a sprocket driven paper tape reader and the sprocket holes are used to generate timing pulses.

Input request source 130 is triggered by a signal applied to line 132 by OR gate 134. One input to OR gate 134 is start contact 136. The other input to this OR gate will be described later.

When input request source 130 is triggered, it applies output signals representing the required address information either in parallel or serially to 11 of the 22 lines 138 i.e., to either the ONE side or the ZERO side input of each register flip-flop to now be described. Twelve lines 138a of the lines 138 are connected to the twelve inputs of flip-flops 140a–140f of the bin address register 140. The other ten lines 138b of the lines 138 are applied to the ten inputs of flip-flops 142a–142e of the document address register 142.

The output from the ONE side of flip-flop 140a is applied through line 21h to the solenoid valve 20h (also see FIG. 1), which controls the horizontal positions of bin 10. The output from the ONE side of flip-flop 140b is applied through line 33h to the solenoid valve 32h which controls the horizontal position of the plate 26 (FIG. 1). The output from the ONE side of flip-flop 140c is applied through line 45h to solenoid valve 46h, which controls the horizontal position of plate 40 (FIG. 1).

The output from the ONE side of flip-flop 140d is applied through line 21v to solenoid valve 20v, which controls the vertical position of bin 10. The output from the ONE side of flip-flop 140e is applied through line 33v to solenoid valve 32v, which controls the vertical position of plate 26. The output from the ONE side of flip-flop 140f is applied through line 45v to solenoid valve 46v, which controls the vertical position of plate 40. The outputs from the ONE sides of flip-flops 142a–142e are applied to control the solenoids for document position piston adder valves 68 (FIG. 1).

Therefore, the setting of the flip-flops in registers 140 and 142 by the signals on lines 138 causes bin 10 (FIG. 1) and the plates 26 and 40 to be properly positioned to form a continuous path from the selected record receiving position 12 to tube 52 leading into optical-read station 54 and, causes stop member 56 to be properly positioned to stop the selected film strip with the desired document under the lens (not shown) in optical-read station 54. When these operations have been completed, a timing pulse is applied by input request source 130 through line 144 to the ONE side input of flip-flop 78 (also shown in FIG. 1). The signal on line 144 might be derived from detectors which indicate that the various elements have been properly positioned. However, in the system of FIG. 1, since no element moves more than one position, the maximum time for positioning the elements is fixed and the line 144 may be energized after a fixed time delay. If the time required for positioning the various elements is less than the time required to pressurize the system, as it often is, the timing pulse on line 144 may be dispensed with and the signal on line 132 applied directly to the ONE side input of flip-flop 78 instead.

When flip-flop 78 is switched to its ONE state, a signal is applied to 3-way valve 74 (FIG. 1) causing vacuum to be applied through this valve and line 76 to the system. The application of vacuum to the system causes the addressed film strip to be drawn from the film strip receiving position 12 through the system to optical-read station 54 and stop member 56. The arrival of the film strip at stop member 56 causes strip-at-read-station-sensor contacts 87 to be closed (also see FIG. 3b) causing an output signal to appear on line 89. Rotation contacts 92 (also see FIG. 3b) generates an output signal on line 96 if the film strip is rotated 180° from the proper position. This signal is applied to the solenoid of valve 70 (see FIGS. 1 and 4) to cause the film strip to be rotated to its proper position. If the film strip is properly oriented in the stop member 56, there is no signal on line 96, and inverter 148 generates an output signal which is applied as one input to AND gate 150. The other input to AND gate 150 is the line 89 from contacts 87.

The output from AND gate 150 is applied as one input to OR gate 152. The other input to OR gate 152 is the line 110 from rotation completion detector contacts 106 and 108 (also see FIG. 4). The output from OR gate 152 is applied to turn on light source 58 and is also applied through normally closed contact 154 to a delay unit 158. The delay unit 158 is of sufficient duration to allow the document at read station 54 to be reproduced on output film 60 (see FIG. 1). The output from delay 158 is applied as one input to OR gate 160. The output from OR gate 160 is applied to turn off light source 58 and to the ZERO side input of flip-flop 78 to switch this flip-flop to its ZERO state.

When contact 154 is in its transferred position, the signal out of OR gate 152 is applied to energize rotation actuator 62 (also see FIG. 1) causing mirror 64 to be placed in the optical path of the output from optical-read station 54. This causes the image of the requested document to be projected on a viewing screen. Since no signal is applied to delay 158 when contact 154 is transferred, light source 58 remains on and flip-flop 78 remains in its ONE state until the user determines that he is finished with the document. He may then either return contacts 154 to their normal position if he desires to have the document reproduced on output film 60, or he may close contact 162 if he desires to have the film strip returned to the storage bin without being reproduced on output film 60. The signal passing through contact 162 is the other input to OR gate 160.

The switching of flip-flop 78 to its ZERO state causes air pressure to be reapplied to the system through valve 74 (FIG. 1) and line 76 to drive the film strip back to its receiving position and also causes a signal to be applied through line 164 to one input of AND gate 166. When the strip returns to the bin, strip-in-bin-detector contacts 128 (also see FIG. 6) generate an output signal on line 168, which is applied to the other input of AND gate 166. The output from AND gate 166 is applied through differentiator 170 to the other input of OR gate 134.

*Operation with single storage bin and read station*

Referring to FIGS. 2 and 3a, assume that it is desired to retrieve document number 31 on the film strip stored in the record receiving position having the row address 3 (xxx011) and the column address 24 (011xxx) (i.e., the record position having the address 011011). This is the record receiving position marked A in FIG. 2.

Referring to FIG. 7, the retrieval of this document is initiated either by closing contact 136 or by fully conditioning AND gate 166 causing a pulse to be applied by differentiator 170 to OR gate 134. In either event, OR gate 134 applies a signal through line 132 to input request source 130, to cause signals representing the bin and document address of the desired document to be passed through lines 138a to bin-address flip-flops 140a–140f and through lines 138b to document-address flip-flops 142a–142e, respectively. For the document being retrieved, the signals on lines 138 cause flip-flops 140a, 140b, 140d, and 140e, of the bin address register to be switched to their ONE state and flip-flops 140c and 140f of this register to be switched to their ZERO state. All of the flip-flops 142a–142e of document address register 142 are switched to their ONE states.

This causes solenoid valves 20h (FIG. 1), 20v, 32h, and 32v to be energized and also causes all five of the solenoid valves to be energized. The energizing of valves 20h and 20v causes air to be applied to lines 18h and 18v, respectively, to move pneumatic cylinders 13h and 13v to their extended positions. Referring to FIG. 2, it is seen that this moves position A into a position in front of an opening in plate 22. This opening is connected through the tube 24x to plate 26.

The energizing of valves 32h and 32v applies air pressure to lines 34h and 34v, respectively, to drive pneumatic cylinders 29h and 29v to their extended positions. This positions the tube 24x in line with the tube 38x. As previously mentioned, tube 38x is already aligned with tube 52. The above described operations cause a single airtight path to be formed from the film-strip receiving position A in bin 10 through plate 22, through tube 24x, through plates 26 and 36, through tube 38x, through plates 40 and 50, and through tube 52 to optical-read station 54 and stop member 56. The energizing of all of the solenoid valves 68 moves piston added 66 to its fully extended position, moving stop member 56 as far as it can be moved into tube 52.

Assume further that the user desires to scan the document before he has it reproduced. Contacts 154 (FIG. 7) are therefore set to their transferred position. After the various elements are positioned, a signal is applied by input request source 130 through line 144 to the ONE input of flip-flop 78. The switching of flip-flop 78 to its ONE state actuates 3-way valve 74 (FIG. 1) to apply vacuum through line 76, to the system. The vacuum draws the selected film strip assembly from film receiving position A in bin 10 through plate 22 through the established path to the read station 54 where it is stopped by stop member 56 with document number 31 under the lens (not shown) in read station 54.

Referring to FIG. 3b, the arrival of the tip 84 of the film strip assembly at stop member 56 closes contacts 87, thereby generating an output signal on line 89. If the film strip is oriented as shown in FIG. 3b, contacts 92 remain open and there is no signal on line 96. In this case, inverter 148 (FIG. 7), generates an output signal to fully condition AND gate 150, the output signal from which is applied to OR gate 152.

However, for the sake of illustration, assume that the film strip rotated more than 90° in one direction during its passage through the transport tubes and therefore, that it is oriented 180° from the position shown in FIG. 3b. Surface 94 therefore abuts against projection 88 closing contacts 92. An output signal on line 96 operates 4-way valve 70 (FIG. 4) to apply air pressure to line 102 and atmospheric pressure to line 100. The application of air pressure to line 102 drives vane 106 around bringing vane 106 into contact with plate 108. Since stop member 56 is attached to vane 106, stop member 56 and therefore the film strip 80 are rotated 180° to properly orient the film strip at the optical-read station 54. The resulting signal on line 110 is applied to OR gate 152 and indicates that the film strip is now properly oriented at the optical-read station.

Regardless of how OR gate 152 is energized, its output turns on light source 58. With the contact 154 in its transferred position, the signal out of OR gate 152 is also applied to rotational actuator 62 to move mirror 64 into the optical path of the light passing through optical-read station 54, whereby the selected document image is projected on a viewing screen (not shown). The light source 58 includes a delay whereby it takes a longer period of time for the light source to be turned on than for the mirror to be positioned, so that the image is not projected on output film 60.

Assume that the user, having scanned the document, decides that he wants it reproduced on output film strip 60. Contacts 154 are then transferred to the position shown in full line in FIG. 7, causing rotational actuator 62 to be deenergized, allowing a mirror 64 to return to the position shown in FIG. 1, and allowing the image to be projected onto output film strip 60. The closing of contacts 154 applies a signal from OR gate 152 to delay 158. The output from delay 158 is applied through OR gate 160 to turn off light source 58 and to the ZERO side input of flip-flop 78 to switch this flip-flop to its ZERO state. As was indicated previously, the delay in delay 158 is sufficient to allow the image of the requested document to be reproduced on output film 60.

If the user decides that he does not want the document reproduced on output film 60, he closes contacts 162 and leaves contacts 154 transferred. This applies a signal through OR gate 160 to turn off light source 158 and to switch flip-flop 78 to its ZERO state, but leaves mirror 64 in its rotated position preventing the image from being reproduced on the output film.

The switching of flip-flop 78 to its ZERO state again applies air pressure through 3-way valve 74 and line 76 to the system. The air pressure acts in a piston-like manner on tip 84 of the film strip assembly to drive the film strip back through the established path into film-strip receiving position A of bin 10. Shock absorber spring 112 (FIG. 5b) at this film-strip receiving position co-acts with tip 84 of the film strip assembly to stop the assembly without causing damage to the film strip.

When the film strip returns to film-strip receiving position A, air pressure is allowed to pass through the tube 120 (FIG. 6) connected to the opening in plate 22 in which tube 24x fits. This causes chamber 124 to be pressurized, raising plunger 126 to close strip-in-bin detector contacts 128. The resulting signal on line 168 is applied as one input to AND gate 166. This gate is conditioned at this time by the signal on line 164 from the ZERO-side of flip-flop 78. The resulting output signal from AND gate 166 is applied through differentiator 170, OR gate 134 and line 132 to trigger input request source 130 to apply information as to the next requested document to lines 138.

GENERAL DESCRIPTION OF FIRST MULTIPLE BIN MULTIPLE READ STATION EMBODIMENT

FIG. 8 shows a schematic emodiment of a system having eight storage stations 200–207 and five read stations 210–213. The storage stations may all be at one location or may be located at a variety of remote locations and the read stations may likewise be positioned at a variety of remote locations.

Each of the storage stations 200–207 has the elements shown in FIG. 1 to the left of transport tube 52. Thus, each storage station has a bin 10 having sixty-four film-strip-receiving positions 12, a matrix plate 22, 16 transport tubes 24 connecting this plate to a matrix plate 26, a matrix plate 36, four transport tubes 38 connecting this plate to a matrix plate 40, and a matrix plate 50 having a single output transport tube. The single output transport tubes from the storage stations 200–207 are designated 220–227 in FIG. 8. Each storage station also has the control solenoids and pneumatic cylinders shown in FIG. 1.

Each of the read stations 210–213 has a single transport tube 230–233, respectively, leading into it. The hardware at each of the read stations is the same as that shown to the right of tube 52 in FIG. 1. Each read station therefore has an optical device 54, a stop member 56, a light source 58, an output film 60, a mirror 64 controlled by a rotational actuator 62, a viewing screen (not shown), a rotation device 72 controlled by a four-way valve 70, a piston adder 66 controlled by valves 68, a 3-way valve 74, having air pressure and vacuum applied to it, and a flip-flop 78 controlling 3-way valve 74. There is also a certain amount of electrical control circuitry at the read station, which will be described later.

The eight lines 220–227 leading out of storage stations 200–207, respectively, may be connected selectively to the four lines 230–233 leading into the four read stations 210–213 by a distribution network 236. Distribution network 236 has a first sub-network 238 which is capable of forming a single air-tight path from any of the lines 220–227 to a single line 240 and a second sub-network 242 which is capable of forming a single air-tight path from any one of the lines 230–233 to the line 240.

Sub-network 238 of the distribution network has two sets of plates, the first of which looks like the right half of the plates 26 and 36, in FIG. 1 and the second set of which looks like the right half of the plates 40 and 50. The first set of plates has eight tubes 220–227 leading into it and two tubes leading out of it, while the second set of plates has two tubes leading into it and the single tube 240 leading out of it.

The second sub-network 242 of distribution network 236 has a single set of plates identical to the plates 40 and 50 in FIG. 1. The four tubes 230–233 are applied to the rear of one of these plates, and this plate is moved one position in the horizontal direction and one position in the vertical direction by pneumatic cylinders 42h and 42v in FIG. 1. The single tube 240 leads out of the other of these plates. The horizontal and vertical position of the first plate of the first set of plates is controlled by two pneumatic cylinders which are similar to pneumatic cylinders 28h and 28v in FIG. 1. These pneumatic cylinders are in turn controlled by four-way solenoid valves. The first plate of the second set of plates has to move only in the vertical plane and is therefore controlled by a single pneumatic cylinder, such as the cylinder 42v in FIG. 1.

Control circuit for a first multiple station-multiple read station embodiment FIGS. 9a and 9b show a control circuit for the embodiment shown in FIG. 8. It consists of an input request source 250 (FIG. 9a) phich may be of the same general type as input request source 130 in FIG. 7, the only difference being that source 250 is required to supply some additional information. Input request source 250 is triggered to generate output signals by a signal on line 252 from OR gate 254. One input to OR gate 254 is from start contacts 256. The other input to OR gate 254 will be described later.

When input request source 250 is triggered, it applies signals representing a particular document request to thirty-two output lines 258. Twelve of these lines 258a are connected to the twelve inputs of flip-flops 260a–260f (FIG. 9b) of bin address register 260. Ten lines 258b are connected to the ten inputs of flip-flops 262a–262e of the document address register 262. Six lines 258c are connected to the six inputs of flip-flops 264a–264c of the storage station address register 264. The remaining four lines 258d are connected to the four inputs of flip-flop 266a–266b of the read station address register 266.

The output from the ZERO side of flip-flop 266a is applied as one input to AND gates 268a and 268c. The output from the ONE side of flip-flop 266a is applied as one input to AND gates 268b and 268d. The output from the ZERO side of flip-flop 266b is applied as the other input to AND gates 268a and 268b while the output from the ONE side of this flip-flop is applied as the other input to AND gates 268c and 268d. The four AND gates 268a–268b combine to form the read-station-address decoder.

An output from AND gate 268a on line 270 means that the requested document is to be sent to read station 210 (FIG. 8); an output from AND gate 268b on line 272 means that the requested document is to be sent to read station 211. An output signal on line 274 from AND gate 268c means that the requested document is to be sent to read station 212 while an output signal on line 276 from AND gate 268d means that the requested document is to be sent to read station 213.

The signals on lines 270–276 are applied as the conditioning inputs to gate groups 278, 280, 282, and 284, respectively, each of which includes five gates and are also applied to condition AND gates 286 (FIG. 9a), 288, 290, and 292, respectively. The information input to gates 278–284 is derived from the ONE side outputs of flip-flops 262a–262e through lines 294. The outputs from gates 278–284 are applied to the solenoid valves 68 (see FIG. 1) which control the stop-element positioning piston adder 66 for the read stations 210, 211, 212 and 213, respectively.

The outputs from the ONE side of flip-flop 266a and 266b of the read station address register are also applied to the solenoids 296 of the two 3-way valves which control the position of the single movable plate in sub-network 242 (FIG. 8) of distribution network 236.

The six outputs from flip-flops 264a–264c of the storage station address register 264 are applied to bin station address AND gate decoder 298. This decoder is the same as the read station address decoder 268 except that it has eight AND gates rather than four and each AND gate has three inputs rather than two. A signal on one of the output lines 300–307 from decoder 298 indicates that the requested document is to be taken from storage station 200–207 (FIG. 8), respectively. The signals on lines 300–307 are applied to condition gate groups 310–317, respectively, each of which gate groups contains six gates, and also as one of the conditioning inputs to AND gates 320–327 (FIG. 9a), respectively. The information input to gates 310–317 is derived from the ONE side outputs of flip-flops 260a–260f of bin address register 260 through lines 328. The outputs from gates 310–317 are applied to control storage station control solenoids 330–337, respectively, for the storage stations 200–207, respectively. Each of the storage station solenoids 330–337 includes the elements shown in the dotted box 141 of FIG. 7.

The outputs from the ONE side of flip-flops 264a–264c are applied to the control solenoids 338, which control the pneumatic cylinders positioning the plates in sub-network 238 (FIG. 8) of the distribution network 236. The output from the ONE side of flip-flop 264a controls the horizontal position of the first plate and the output from the ONE side of flip-flops 264b controls the vertical position of this plate. The output from flip-flop 264c controls the vertical position of the second plate.

Thus, the various elements described so far combine to form a single air-tight path from a selected film strip receiving position of a selected storage station through the appropriate interconnecting tube 220–227, through the two sub-networks 238 and 242 of distribution network 236, and through the appropriate tube 230–233 to the selected read station 210–213. When these operations have been completed, a timing pulse is applied to line 339, FIG. 9b, by input request source 250. It is noted that no more time is required to position the elements in FIG. 8 then was required to position the element in FIG. 1, since the positioning of the elements in distribution network 236 occurs simultaneously with the positioning of the elements at the storage station. The signal on line 339 is applied as the other input to AND gates 286–292 (FIG. 9a). The outputs from AND gates 286–292 are applied to the ONE side inputs of flip-flops 340–343, respectively. Flip-flops 340–343 perform the same functions as flip-flop 78 (FIG. 1) and (FIG. 7) and are located at the read stations 210–213, respectively. This means that the switching of a flip-flip 340–343 to its ONE state causes vacuum to be applied to the system by this read station.

Each read station also has the electronic control circuitry shown in the dotted box 163 in FIG. 7. In FIG. 9a, the electronic control circuits at read stations 210–213 are represented by the blocks 350–353, respectively. When the utilization of a document has been completed in any of the three possible manners described with reference to FIG. 7, this fact is indicated by an output signal from the appropriate read station control circuit. These output signals from the control circuits 350–353 are applied through lines 360–363 to the ZERO side inputs of flip-flops 340–343, respectively, and, through OR gate 364 to the ONE side input of flip-flop 366. The output from the ONE side of flip-flop 366 is applied as a second conditioning input to AND gates 320–327.

The switching of the appropriate flip-flop 340–343 to its ZERO state, causes air to be applied to the transport path through which the requested document was derived. This drives the film strip back through the formed path to its film strip receiving position in the bin. When this occurs, an ouput signal is derived from the appropriate strip-in-bin detector 370–377. Each of the strip-in-bin detectors is of the type shown in FIG. 6. The outputs from the strip-in-bin detectors 370–377 are applied as the third inputs to AND gates 320–327, respectively. The outputs from AND gates 320–327 are applied through OR gate 378 to differentiator 380. The pulse out of differentiator 380 is applied as the other input to OR gate 254 and also is applied through line 382 to the ZERO side input of flip-flop 366.

*Operation of first multiple storage station multiple read station embodiment*

To illustrate the operation of the system shown in FIGS. 8 and 9, assume that it is desired to select document No. 31 on the film strip which is stored in film strip receiving position A (FIG. 2) of the bin 10 at storage station 207 and that it is desired to utilize this document at read station 212.

As before, the operation is started by applying a signal through OR gate 254 (FIG. 9a) and line 252 to input request source 250. This signal may be derived from either differentiator 380 or from start contact 256. The triggering of source 250 causes the required information as to the requested document to be applied through lines 258a–258d to bin-address-register flip-flops 260a–260f (FIG. 9b) document-address-register flip-flops 262a–262e, storage-station-address-register flip-flops 264a–264c, and read-station-address-register flip-flops 266a–266e, respectively. This sets flip-flops 260a, 260b, 260d, 260e, 262a–262e, 264a–264c, and 266b to their ONE states and the remaining flip-flops of the bin address register 260 and the read station address register 266 to their ZERO state.

All of the flip-flops 264a–264c being in their ONE states, causes bin-station-address decoder 298 to generate an output signal on line 307 which is applied to conditioned gates 317 to apply the contents of bin-address-register flip-flops 260a–260f to storage-station-control solenoids 337. This causes the bin 10, the plate 26, and the plate 40 for storage station 207 to be positioned in a manner previously described with reference to FIGS. 1 and 7 to form a single air-tight path from position A (see FIG. 2) of the storage bin at station 207 to transport tube 227.

Flip-flop 266a being in its ZERO state, and 266b in its ONE state, causes AND gate 268c to be fully conditioned. The resulting output signal on line 274 is applied to condition gates 282 to pass the information contained in document-address-register flip-flops 262a–262e through lines 294 and the conditioned gates 282 to the solenoids of the valves 68 for read station 212. This causes piston adder 66 (FIG. 1) to be advanced to its fully extended position to move stop member 56 as far into transport tube 212 as it will go. This operation is the same as that described in detail with reference to FIGS. 1 and 7.

The outputs from the ONE sides of flip-flops 264a–264c are also applied to solenoid valves 338 to cause all three of the penumatic cylinders controlled by these valves to be raised to their extended position. As was previously indicated, this causes a single air-tight path to be formed through sub-network 238 of distribution network 236 from line 227 to line 240.

Finally, the output from the ONE side of flip-flop 266b is applied to energize the second of the solenoid valves 296. This raises the movable plate in sub-network 242 of distribution network 236 one position to form a single air-tight path connecting the line 240 to the line 232.

From the above, it can be seen that at this time a single air-tight path has been formed from the storage position A (FIG. 2) in the storage bin of storage station 207 through plate 22 (FIG. 1) tube 24x, plates 26 and 36, tube 38x, plates 40 and 50 at storage station 207, through line 227 (FIG. 8) the tubes and plates of sub-network 238 of distribution network 236, transport tube 240, the tubes and plates of sub-network 242 and tube 232 to the optical-read station 54 and stop member 56 of read station 212.

At this time, a timing pulse is applied to line 339 by input request source 250. This signal passes through AND gate 290 which is conditioned at this time by the signal on line 274, to the ONE-side input of flip-flop 342. The switching of flip-flop 342 to its ONE state causes vacuum to be applied to the system through the elements of read station 212. This vacuum causes the selected film strip to be drawn from position A of the bin at storage station 207 through the above described transport path to read station 212. The operations on the document and the film strip at the read station are identical to those described in detail with reference to FIGS. 1 and 7. The film strip is stopped at the read station with the requested document under the lens of optical-read station 54 (FIG. 1) and the film strip is rotated 180° if the rotation contact 92 (FIG. 4) indicates that the film strip is not properly oriented. Light source 58 is then turned on and the document is either reproduced on output film 60 or is reflected by mirror 64 to be viewed on a viewing screen (not shown) depending on the desires of the user. When the requested document has been reproduced on output film 60 or when the user has determined that he wishes to return the document to its storage position without having it reproduced, read station control circuit 352 (FIG. 9a) generates an output signal on line 362.

The signal on line 362 is applied to switch flip-flop 342 to its ZERO state and is also applied through OR gate 364 to switch flip-flop 366 to its ONE state. The switching of flip-flop 342 to its ZERO state causes air pressure to be applied to the system through read station 212. This air pressure bears against tip 84 (FIG. 3b) of the film strip assembly to drive it through the above described transport path to its position in storage station 207. The switching of flip-flop 366 to its ONE state, causes a conditioning signal to be applied to AND gate 327. A second conditioning signal for this AND gate is derived from the line 307 from bin-station-address decoder 298. This latter conditioning signal is not essential to the operation of the device, but does provide a check to be sure that the film strip is returned to the proper storage station. When the film strip reaches the proper film-strip receiving position in the bin of storage station 207, strip-in-bin detector 377 generates an output signal to fully condition AND gate 327. The output signal from AND gate 327 is applied through OR gate 378 to differentiator 380. The pulse out of differentiator 380 is applied through line 382 to switch flip-flop 366 back to its ZERO state and is applied through OR gate 254 and line 252 to trigger input request source 250 to apply signals representing the required information as to the next requested document to lines 258.

To simplify the control circuitry, FIGS. 9a and 9b have shown the system as being capable of processing only a single document at a time. However, additional sets of registers could be provided so that information as to more than one requested document could be stored at any given time. Therefore, when a particular document is fed to a read station, an indication could be given to the system to switch control of it to the next set of register. The fact that a document is at a given read station would cause an inhibit signal to be applied to the system to prevent a further document from being sent to that read station. When the utilization of the requested document is completed, a signal would be applied to the system indicating that the film strip is now ready to be returned to the storage position in the storage station from which it was taken. As soon as the system is free, control of the path forming elements would be returned to the original set of registers and a path would be formed to return the film strip to its receiving position.

GENERAL DESCRIPTION OF SECOND EMBODIMENT OF MULTIPLE STORAGE STATION MULTIPLE READ STATION EMBODIMENT

A limitation of the embodiment shown in FIG. 8 is that only a single transport path can be formed through it at any given time. FIG. 10 shows an embodiment which overcomes this limitation and therefore provides a far more flexible system.

Referring to FIG. 10, eight storage stations 200–207 are shown, each having a transport tube 220–227 leading therefrom. These stations and tubes are identical to and have the identical function to the elements bearing the same numbers in FIG. 8. The embodiment of FIG. 10 also has four read stations 210–213, each having a line 230–233 leading into it. As before, these elements are the same as the like-numbered elements in FIG. 8. The embodiment shown in FIG. 10 also has a distribution network 398 which includes seven first sub-networks 400–407 and four second sub-networks 410–413. Each of the first sub-networks 400–407 is a one-level transport-tube-control assembly identical to the transport tube assembly 242 (FIG. 8) previously described. The single input lines to each of these sub-networks are the lines 220–227, respectively. The four transport tubes leading out of each of the sub-networks 400–407 are connected one to each of the transport tube sub-networks 410–413. The sub-networks 410–413 are two level transport tube assemblies identical to the to level transport tube assemblies 238 (FIG. 8) previously described. The single tube leading out of each of the sub-networks 410–413 are the transport tubes 230–233, respectively.

With the system shown in FIG. 10, a path may be maintained from a given storage station to a given read station for an indefinite period of time during which the system is available to supply documents from each of the other storage stations to each of the other read stations without interrupting the existing transport path. Therefore, while new paths may be formed during the time that a document is being utilized as was suggested above for the embodiment shown in FIG. 8, it is not necessary to use this procedure to keep the system open while a document is being utilized. This ability of the system to simultaneously pass documents from various storage stations to various read stations allows the user to scan a document to determine if he wishes to have it reproduced without tieing up the system.

The control circuitry for this embodiment is the same as that shown in FIG. 9, with the following exceptions: Four sets of control solenoids 338 are required rather than one. Eight sets of control solenoids 296 are required rather than one. Signals from storage-station-address-register flip-flops 264a–264c must be gated through to the four sets of control solenoids 338 under control of gating signals on lines 270–276 from read-station-address decoder 268. Signals from read-station-address register flip-flops 266a–266b are gated through to the eight sets of control solenoids 296 under control of gating signals on lines 300–307 from bin-station-address decoder 298. The control solenoids 338 control the positions of the sub-networks 410–413 and the control solenoids 296 control the path formed through sub-networks 400–407. The other additional elements are (a) additional sets of registers to store subsequently applied requests, and (b) means for inhibiting the use of a given sub-network 400–407 and 410–413 when this sub-network is already in use.

ADDITIONAL FEATURES

As was mentioned previously, it is often desirable to store all of the documents relating to a particular subject or to a particular class on a single film strip. Since additional documents relating to the particular subject matter or class will be coming into the system from time to time, the full capacity of this film strip will not initially be utilized. At present, this situation is handled by making a complete new film strip each time a new document is added. A preferable procedure would be to develop only so much of the film strip as is being used at any given time, and add documents to it by developing additional portions of the film strip as required. For this procedure to be followed, the transport and storage system for the film strips must be completely light-tight so that light cannot get to and ruin the unexposed portions of the film strip. Since the system of this invention is a completely closed one, it may be made light-tight using opaque tubes for the transport tubes 24, 33, etc.

For the system of this invention to operate properly, it is necessary that it also be air-tight so that the air pressure or vacuum required to transport a film strip is not lost. This use of an air-tight system gives the added advantage that the film strip is never exposed to the atmosphere and is therefore kept completely dust and dirt free.

FIG. 8 shows one way of increasing the capacity of this systemm, namely, by having a plurality of storage bins which are connected to a line leading into a read station by a distribution network such as 238. In this way, the capacity of the system may be increased to many times its original capacity without causing any significant alteration in the original system. The capacity of the system may also be increased by using either longer film strips or by using film strips having a plurality of columns of documents stored thereon and having the lens at optical-read station 54 mounted on a movable arm which is capable of positioning it over the column containing the requested document. Hardware for performing this function is shown in copending application Serial No. 271,816, filed April 9, 1963 on behalf of R. K. Wilmer, entitled "Document Retrieval System," now U.S. Patent 3,158,287, and assigned to the assignee of the instant application.

In the description of the invention so far, it has been assumed that the transport tubes used are flexible. If it is desired to use rigid transport tubes or if it is desired to reduce wear on the tubes by not flexing the, the relative positioning of the plates may be accomplished by moving an entire assembly (for example: plate 36, tubes 38, and plate 40), as a unit rather than by moving a single plate. To do this, a smaller bin must be used and an extra level of transport tubes added.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A system for retrieving a record strip comprising:
   a plurality of record strip storing positions, said positions being arranged in a matrix array;
   means for indicating the position in which a selected record strip is stored;
   a path forming means comprising flexible tubing;
   a record utilization means;
   means operable in response to said indicating means for forming in said path forming means a single path of arranged tubing from the indicated position through said path forming means to said utilization means;
   and pneumatic means for driving said selected record strip through said formed path.

2. A record retrieval system comprising:
   a record storage bin having a plurality of storage positions arranged in a matrix array, each position having an address;
   a record utilization station;
   a plurality of record transport path segments comprising short lengths of tubing arrangeable selectively to form a path from any said storage position to said utilization station;
   means for applying bin position addresses selectively to said system;
   means responsive to said applied addresses for arranging said path segments by short tube end movement to form a path in accordance with said applied addresses;
   and fluid pressure means for transporting a record through said formed path.

3. A system for retrieving a record strip comprising:
   a first plurality of record strip storing positions;
   a second plurality of record strip storing positions;
   record utilization means;
   path forming means comprising matrices of flexible cylindrical tubing with abutting ends;
   first means for indicating in which plurality of storing positions a desired record strip is stored;
   second means for indicating the storing position in the indicated plurality of storage positions in which the desired record strip is stored;
   means operable in response to the indications in said first and second indicating means for forming a single path by short shifts of said tubing ends in said path forming means from said indicated storing position, in said indicated plurality of storing positions, through said path forming means to said utilization means;
   and pneumatic means for driving the desired record strip through said formed path.

4. A system for retrieving a record strip comprising:
   a plurality of record strip storing positions;
   first record utilizing station;
   second record utilization station;
   path forming means;
   means for indicating the storing position in which a desired record strip is stored;
   station for indicating the utilization means which is to be used;
   means operable in response to said storing position indicating means and said utilization indicating means for forming a single path in said path forming means from said indicated position, through said path forming means to said indicated utilization station;
   and means for driving the desired record strip through said formed path.

5. A system for retrieving a record strip comprising:
   a first plurality of record strip storing positions;
   a second plurality of record strip storing positions;
   a first record utilization station;
   a second record utilization station;
   a path forming means;
   means for indicating the storing position in which a desired record strip is stored;
   station for indicating the utilization means which is to to be used;
   means operable in response to said storing position indicating means and said utilization indicating means for forming a single path in said path forming means from said indicated position, through said path forming means to said indicated utilization station;
   and means for driving the desired record strip through said formed path.

6. A system for retrieving an individual document stored as one of a plurality of documents arranged in a column on a record strip comprising:
   a plurality of record strip storing positions, said positions being arranged in a matrix array;
   a path forming means comprising flexible tubing;
   a document utilization means;
   means for indicating the position in which the record strip containing a desired document is stored;
   means operable in response to said indicating means for forming in said path forming means a single path of joined tubing from the indicated position through said path forming means to said utilization means;
   means for indicating the relative position on said record strip at which the desired document is stored;
   fluid means for driving the desired record strip through said formed path;
   and means operable in response to said relative position indicating means for stopping said record strip with the desired document at said utilization means.

7. A system for retrieving a record strip comprising:
   a plurality of record strip storing positions, said positions being arranged in a matrix array;
   a first array of transport tubes positioned in front of said storing positions;
   means for causing relative motion between said storing positions and said transport tubes, whereby each of said transport tubes may be positioned in front of a plurality of said storing positions;
   N arrays of transport tubes positioned one in front of the other in front of said first array of transport tubes, the number of transport tubes in each of said arrays being less than in the array behind it, there being only one transport tube in the front-most array;

means for causing relative motion between each of said arrays of transport tubes and the arrays of transport tubes adjacent to it;

the number N being a function of the number of storing positions and the amount of relative motion caused by said relative motion causing means;

means for indicating the position in which a desired record strip is stored;

a record utilization means;

said relative motion causing means being operable in response to said indicating means for causing said transport tubes to be formed into a single path from said indicated position through one transport tube in each of said arrays, to said utilization means;

and means for driving the desired record strip through said formed path.

8. A system for retrieving a requested record comprising:

a storage bin having a plurality of record storage positions;

a utilization means;

a plurality of levels of transport members positioned between said storage bin and said utilization means, each transport member in the level nearest said storage bin being associated with a given number of storage positions in said bin, each transport member in each succeeding level being associated with a given number of members in the preceding level, and the last level leading into said utilization means having a single transport member;

means operable in response to a request for a record for aligning the storage bin and said levels of transport member to form a single air-tight path from the storage position containing the requested record through said levels of transport members to said utilization means;

and means operable when said path is formed for transporting said requested record from the storage position in said storage bin containing it through the path formed through said levels of transport members to said utilization device.

9. A system of the type described in claim 8 wherein said given number of transport members with which a transport tube in a given level is associated with may be different for each of the levels.

10. A system of the type described in claim 8 including:

means for indicating that the utilization of a requested record has been completed;

and means responsive to said indicating means for transporting said requested record back through said formed path to the storage position in said bin from which it was drawn.

11. A device of the type described in claim 8 including:

head means affixed to each of said records, the dimensions of said head means being such as to cause it to fit tightly into said record storage positions and said transport members;

and means at said utilization device for co-acting with said head means to correct for any rotation of the record which might occur in said transport members.

12. A device of the type described in claim 8 characterized by the fact that said transport members are opaque, whereby said formed path is light-tight.

13. A system for retrieving a requested record comprising:

a storage bin having a plurality of record storage positions;

a utilization means;

a plurality of levels of transport members positioned between said storage bin and said utilization means, there being one transport member in the level nearest said storage bin associated with a fixed number of storage positions in said bin;

one transport members in each succeeding level associated with said fixed number of members in the preceeding level, and one transport member in the lowest level leading into said utilization means;

means operable in response to a request for a record for aligning the storage bin and said levels of transport members to form a single air-tight path from the storage position containing the requested record through said levels of transport members to said utilization means;

and means operable when said path is formed for drawing said requested record from the storage position in said storage bin containing it through the path formed through said levels of transport members to said utilization means.

14. A system for retrieving a requested record comprising:

a storage bin having a plurality of record storage positions, the number of said record storage positions being an integral power of two;

a utilization means;

a plurality of levels of transport members positioned between said storage bin and said utilization means, there being one transport member in the level nearest said storage bin associated with each $(2)^D$ storage positions in said bin, where D is the number of dimensions of the face of said storage bin, one transport member in each succeeding level associated with each $(2)^D$ members of the preceding level, and one transport member in the last level leading into said utilization means;

means operable in response to a request for a record for causing said storage bin and said transport path to be moved not more than one position in any dimension to form a single, air-tight path from the storage position containing the requested record through said levels of transport members to said utilization means;

and means operable when said path is formed for drawing said requested record from the storage position containing it through the path formed through said levels of transport members to said utilization means.

15. A system for retrieving a requested document stored at one of a plurality of documents on a record member comprising:

a storage bin having a plurality of record storage positions;

a utilization means;

a plurality of levels of transport members positioned between said storage bin and said utilization means, each transport member in the level nearest said storage bin being associated with a given number of storage positions in said bin, each transport member in each succeeding level being associated with a given number of members in the preceding level, and the last level leading into said utilization means having a single transport member;

means operable in response to a request for a document for aligning the storage bin and said levels of transport members to form a single air-tight path from the storage position containing the record on which the requested document is stored through said levels of transport members to said utilization means;

means operable when said path is formed for drawing the record containing the requested document from the storage position containing it through the path formed through said levels of transport members to said utilization means;

means for indicating the relative position of said requested document on the record containing it;

and means operable in response to the indication in said relative position indicating means for stopping said record in the transport member of the last level with the requested document at said utilization means.

16. A system for retrieving a record from any one of a plurality of remote storage stations and applying it to any one of a plurality of remote utilization stations comprising:

a bin at each of said storage stations, each of said bins having a plurality of record storage positions;

bin indicating means for indicating at which storage station a requested record is stored;

record indicating means for indicating the address of the record storage position in which said requested record is stored;

a bin transport means leading out of each of said storage stations;

means responsive to the indications in said bin indicating means and said record indicating means for forming a single air-tight path from the storage position containing the requested record to the bin transport means leading out of the indicated storage station;

means for indicating the utilization station to which the requested record is to be applied;

a utilization station transport means leading into each utilization station;

distribution means operable in response to the indications in said bin indicating means and said utilization station indicating means for forming a single air-tight path connecting the bin transport means leading out of the indicated storage station to the utilization-station transport means leading into the indicated utilization station;

and means operable when said air-tight paths have been formed for causing said requested record to be drawn from the storage position in which it is stored through the air-tight path leading to the bin transport means, through the bin transport means, through the path formed in said distribution means, and through said utilization station transport means to the indicated utilization station.

17. A device of the type described in claim 16 including:

return means operable when the utilization of a requested record has been completed for driving said record back through the same path through which it was drawn to the storage position at the indicated storage station from which it was drawn.

18. A device of the type described in claim 17 including:

utilization detection means for detecting when the utilization of a record has been completed;

means responsive to said utilization detection means for operating said return means;

and means for disabling said last-mentioned means and for permitting manual control at said utilization station of said return means.

References Cited

UNITED STATES PATENTS

| | | | |
|---|---|---|---|
| 3,124,260 | 3/1964 | Tidball | 214—95 |
| 3,149,529 | 9/1964 | Critchlow | 88—24 |
| 3,158,287 | 11/1964 | Wilmer | 221—13 |
| 3,174,645 | 3/1965 | Barcia | 221—88 |

DARYL W. COOK, *Acting Primary Examiner.*

R. COUNCIL, *Assistant Examiner.*